United States Patent
Broeckx et al.

(10) Patent No.: US 9,873,303 B2
(45) Date of Patent: Jan. 23, 2018

(54) DAMPER HAVING REINFORCED CATCHER

(71) Applicant: Tenneco Automotive Operating Company Inc., Lake Forest, IL (US)

(72) Inventors: Sven Broeckx, Hasselt (BE); Tomasz Górski, Łaziska Górne (PL); Julien Wilkin, Fraiture (BE); Jan Wójtowicz, Bobrowniki (PL)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 15/077,214

(22) Filed: Mar. 22, 2016

(65) Prior Publication Data

US 2017/0274719 A1    Sep. 28, 2017

(51) Int. Cl.
*B60G 15/06*    (2006.01)

(52) U.S. Cl.
CPC ......... *B60G 15/063* (2013.01); *B60G 15/062* (2013.01); *B60G 2202/312* (2013.01);
(Continued)

(58) Field of Classification Search
CPC ....... F16F 13/005; F16F 13/007; B60G 11/56; B60G 11/58; B60G 15/062; B60G 15/063;
(Continued)

(56) References Cited

U.S. PATENT DOCUMENTS

| 2,147,660 A | 2/1939 | Loewus |
| 3,857,726 A | 12/1974 | Van Gils |

(Continued)

FOREIGN PATENT DOCUMENTS

| DE | 102008043527 A1 | 5/2010 |
| DE | 102010028290 A1 | 11/2011 |

(Continued)

OTHER PUBLICATIONS

Matthij, Paul, et al., "Tailored Fiber Placement-Mechanical Properties and Applications", Journal of Reinforced Plastics and Composites, Jun. 1998, pp. 774-786, vol. 17, No. 9, Technomic Publishing, US.

(Continued)

*Primary Examiner* — Anna M Momper
(74) *Attorney, Agent, or Firm* — Harness, Dickey & Pierce, P.L.C.

(57) ABSTRACT

A strut-type damper is disclosed. The damper has a shock absorber having a housing with a telescoping piston rod, a coil spring, an upper spring seat operably coupled to a distal end of the piston rod, and a lower spring seat operatively coupled to the housing. The upper and lower spring seats capture the coil spring therebetween. The lower spring seat has a base portion having an opening for receiving the housing and is fixedly securable to the housing. A generally circumferential wall portion extends from the base portion and forms a catcher for catching a broken portion of the coil spring if the coil spring fractures. An impact absorbing structure is formed on the lower spring seat adjacent both of the catcher and the base portion, and is configured to be crushed in the event of a fracture of the coil spring.

23 Claims, 7 Drawing Sheets

(52) U.S. Cl.
CPC .............. *B60G 2204/12422* (2013.01); *B60G 2206/7104* (2013.01)

(58) Field of Classification Search
CPC .......... B60G 2202/312; B60G 2202/31; B60G 2204/1242; B60G 2204/12422
See application file for complete search history.

(56) References Cited

U.S. PATENT DOCUMENTS

| | | | |
|---|---|---|---|
| 4,119,748 A | 10/1978 | Verbauwhede et al. | |
| 4,366,969 A | 1/1983 | Benya et al. | |
| 4,462,608 A | 7/1984 | Lederman | |
| 4,562,997 A | 1/1986 | Iwata et al. | |
| 4,683,993 A | 8/1987 | Tanabe et al. | |
| 5,454,585 A | 10/1995 | Dronen et al. | |
| 5,467,971 A | 11/1995 | Hurtubise et al. | |
| 5,553,713 A | 9/1996 | Sydekum et al. | |
| 5,620,172 A | 4/1997 | Fulks et al. | |
| 5,664,892 A | 9/1997 | Kellam | |
| 5,788,262 A | 8/1998 | Dazy et al. | |
| 6,126,155 A | 10/2000 | Smith et al. | |
| 6,155,544 A | 12/2000 | Solomond et al. | |
| 6,273,407 B1* | 8/2001 | Germano | B60G 13/005 267/172 |
| 6,367,830 B1 | 4/2002 | Annequin et al. | |
| 6,382,648 B1 | 5/2002 | Handke | |
| 6,398,201 B1 | 6/2002 | Solomond et al. | |
| 6,412,879 B1 | 7/2002 | Ogoniek et al. | |
| 6,692,012 B2 | 2/2004 | Fullenkamp et al. | |
| 7,077,390 B2 | 7/2006 | Miller et al. | |
| 7,090,058 B2 | 8/2006 | Miyazaki et al. | |
| 7,416,175 B2 | 8/2008 | Al-Dahhan | |
| 8,109,492 B2 | 2/2012 | Winocur | |
| 8,196,941 B2 | 6/2012 | Nowak | |
| 8,348,029 B2 | 1/2013 | Winocur | |
| 8,382,080 B2 | 2/2013 | Suchta et al. | |
| 8,496,383 B2 | 7/2013 | Viault et al. | |
| 8,616,538 B2 | 12/2013 | Al-Dahhan et al. | |
| 8,696,004 B2 | 4/2014 | Baker et al. | |
| 8,939,439 B2 | 1/2015 | Corbett et al. | |
| 2002/0158393 A1* | 10/2002 | Handke | B60G 13/003 267/221 |
| 2003/0047399 A1 | 3/2003 | Miller et al. | |
| 2003/0218286 A1 | 11/2003 | Miyazaki et al. | |
| 2004/0051270 A1 | 3/2004 | Causemann | |
| 2004/0074589 A1 | 4/2004 | Gessler et al. | |
| 2004/0159993 A1 | 8/2004 | Miller et al. | |
| 2007/0194507 A1 | 8/2007 | Kato et al. | |
| 2009/0166940 A1* | 7/2009 | Lutz | B60G 11/16 267/170 |
| 2010/0032877 A1 | 2/2010 | Suchta et al. | |
| 2010/0230877 A1 | 9/2010 | Schudt et al. | |
| 2011/0266765 A1 | 11/2011 | Nowak | |
| 2012/0181127 A1 | 7/2012 | Keil et al. | |
| 2013/0052392 A1 | 2/2013 | Radlmayr et al. | |
| 2013/0147149 A1 | 6/2013 | Baker et al. | |
| 2014/0045400 A1 | 2/2014 | Vandewalle | |
| 2015/0123329 A1* | 5/2015 | Toyota | B60G 15/063 267/221 |
| 2016/0023529 A1* | 1/2016 | Wilkin | B60G 15/063 267/221 |
| 2016/0031282 A1 | 2/2016 | Hernette et al. | |
| 2016/0137017 A1* | 5/2016 | Wilkin | B60G 15/063 267/221 |
| 2016/0185177 A1* | 6/2016 | Kaneko | F16F 9/3235 267/221 |

FOREIGN PATENT DOCUMENTS

| | | |
|---|---|---|
| DE | 102011051403 A1 | 1/2013 |
| DE | 10312085 B4 | 10/2014 |
| EM | 567845 A1 | 11/1993 |
| EM | 1483137 B1 | 4/2007 |
| EP | 2960542 A1 | 12/2015 |
| GB | 2347906 A | 9/2000 |
| JP | 2010116113 A | 5/2010 |
| WO | 3044549 A1 | 6/2001 |
| WO | 2003076234 A1 | 9/2003 |
| WO | 2004101909 A1 | 11/2004 |
| WO | 2005118263 A1 | 12/2005 |
| WO | 2009062764 A1 | 5/2009 |
| WO | 2013041254 A1 | 3/2013 |
| WO | 2013041255 A1 | 3/2013 |

OTHER PUBLICATIONS

Crothers, P.J., et al., "Tailored Fibre Placement to Minimise Stress Concentrations", Composites Part A: Applied Science and Manufacturing, Jan. 1, 1997, pp. 619-625, vol. 28A, Elsevier Science Publishers B.V., Amsterdam, NL.

* cited by examiner

DAMPER HAVING REINFORCED CATCHER

FIELD

The present disclosure relates to dampers used with motor vehicle suspension systems, and more particularly to a damper having a spring seat designed in a manner, and from a material, which absorbs the energy produced if a coil spring of the damper fractures, and which operates to significantly reduce the chance of the fractured coil spring contacting a wheel of the vehicle.

BACKGROUND

The statements in this section merely provide background information related to the present disclosure and may not constitute prior art.

Strut-type suspension systems are well known in the motor vehicle industry. Such telescopic suspension systems are also commonly known as McPherson shock absorbers. A strut-type shock absorber assembly normally incorporates a hydraulic damper and is used as one of the locating members for the wheel of the motor vehicle. A strut-type shock absorber assembly typically includes a coil spring concentrically disposed around a shock absorber. The coil spring extends between an upper spring seat, which is a part of a top mount assembly for the strut-type shock absorber assembly, and a lower spring seat, which is attached to the shock absorber component of the strut-type shock absorber assembly.

The lower spring seat can be a single piece component made of metal or plastic. A plastic spring seat is lighter in weight than its metal counterpart, and for that reason is particular desirable with motor vehicle manufacturers for the reason that it reduces the weight of the overall assembly. An annular inner portion of the lower spring seat is designed to interface with an outer tube of the shock absorber. The lower spring seat supports and maintains the correct position of the coil spring under various driving conditions of the vehicle. The lower spring seat resists braking loads, wear, abrasion, changing loads and impacts by stones and other road debris.

During a severe impact, however, the coil spring may fail (i.e., fracture). For this reason the lower spring seat may incorporate some structure that acts as a "catcher" to catch the fractured spring and reduce the chance of the fractured spring contacting the wheel of the vehicle. As such, the construction of the lower spring seat is a highly important consideration in the design of a strut-type shock absorber assembly.

A significant challenge when designing a plastic or composite reinforced spring seat component, however, is the generally low toughness of spring seats made from plastics or composites, when compared to spring seat components made from common metals such as steel. Accordingly, improving the toughness of a spring seat member, and particularly the catcher, without tangibly increasing its weight or expense, has proven to be a significant challenge.

SUMMARY

In one aspect the present disclosure relates to a strut-type damper. The damper may comprise a shock absorber having a housing with a telescoping piston rod projecting at least partially therefrom, a coil spring, an upper spring seat and a lower spring seat. The upper spring seat may be operably coupled to a distal end of the piston rod. The lower spring seat may be operatively coupled to the housing of the shock absorber. The upper and lower spring seats capture the coil spring therebetween. The lower spring seat includes a base portion having an opening for receiving the housing of the shock absorber and is fixedly securable to the housing. The lower spring seat also includes a generally circumferential wall portion extending from the base portion which forms a catcher for catching a portion of the coil spring in an event where the coil spring fractures. An impact absorbing structure is formed on the lower spring seat adjacent both of the catcher and the base portion, and configured to be crushed in the event of a fracture of the coil spring.

In another aspect the present disclosure relates to a strut-type damper. The damper may comprise a shock absorber having a housing with a telescoping piston rod projecting at least partially therefrom. The damper may also comprise a coil spring, an upper spring seat and a lower spring seat. The upper spring seat may be operably coupled to a distal end of the piston rod. The lower spring seat may be operatively coupled to the housing of the shock absorber, with the upper and lower spring seats capturing the coil spring therebetween. The lower spring seat may include a base portion having an opening for receiving the housing of the shock absorber and may be fixedly securable to the housing. The lower spring seat may also include a generally circumferential wall portion extending from the base portion and integrally formed with the base portion. The generally circumferential wall portion forms a catcher for catching a portion of the coil spring in an event where the coil spring fractures. The lower spring seat further includes a plurality of circumferentially spaced apart, impact absorbing structures formed on the lower spring seat adjacent both of the catcher and the base portion, and extending from an inside wall portion of the catcher. Each impact absorbing structure is configured to be crushed in the event of a fracture of the coil spring and to absorb and dissipate energy from a broken portion of a fractured coil spring.

In still another aspect the present disclosure relates to a strut-type damper. The damper may comprise a shock absorber having a housing with a telescoping piston rod projecting at least partially therefrom, a coil spring, an upper spring seat and a lower spring seat. The upper spring seat is operably coupled to a distal end of the piston rod. The lower spring seat is operatively coupled to the housing of the shock absorber, with the upper and lower spring seats capturing the coil spring therebetween. The lower spring seat may include a base portion having an opening for receiving the housing of the shock absorber and is fixedly securable to the housing. The lower spring seat also includes a generally circumferential wall portion extending from the base portion and being integrally formed with the base portion. The generally circumferential wall portion forms a catcher for catching a portion of the coil spring in an event where the coil spring fractures. A plurality of circumferentially spaced apart, impact absorbing structures are formed on the lower spring seat adjacent both of the catcher and the base portion, and may extend from an inside wall portion of the catcher. Each impact absorbing structure is configured to be crushed in the event of a fracture of the coil spring and to absorb and dissipate energy from a broken portion of a fractured coil spring. Each impact absorbing structure may include a first crush rib extending from an inside wall portion of the catcher radially inwardly toward an axial center of the lower spring seat. The first crush rib is configured to absorb and dissipate energy from a portion of the coil spring when the coil spring fractures. Each impact absorbing structure may also include a second crush rib for further helping to absorb and dissipate energy from the portion of the fractured coil spring. The second crush rib may be integrally formed with the first crush rib and arranged generally tangentially relative to an axial center of the lower spring seat. The lower spring seat and the impact absorbing structures may also be integrally formed as a single piece component.

In still another aspect the present disclosure involves using an independent system to absorb impacts. The independent system is formed by a plate having a plurality of rib structures projecting outwardly from a floor portion of the plate. The plate is intended to rest within a catcher portion of a lower spring seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
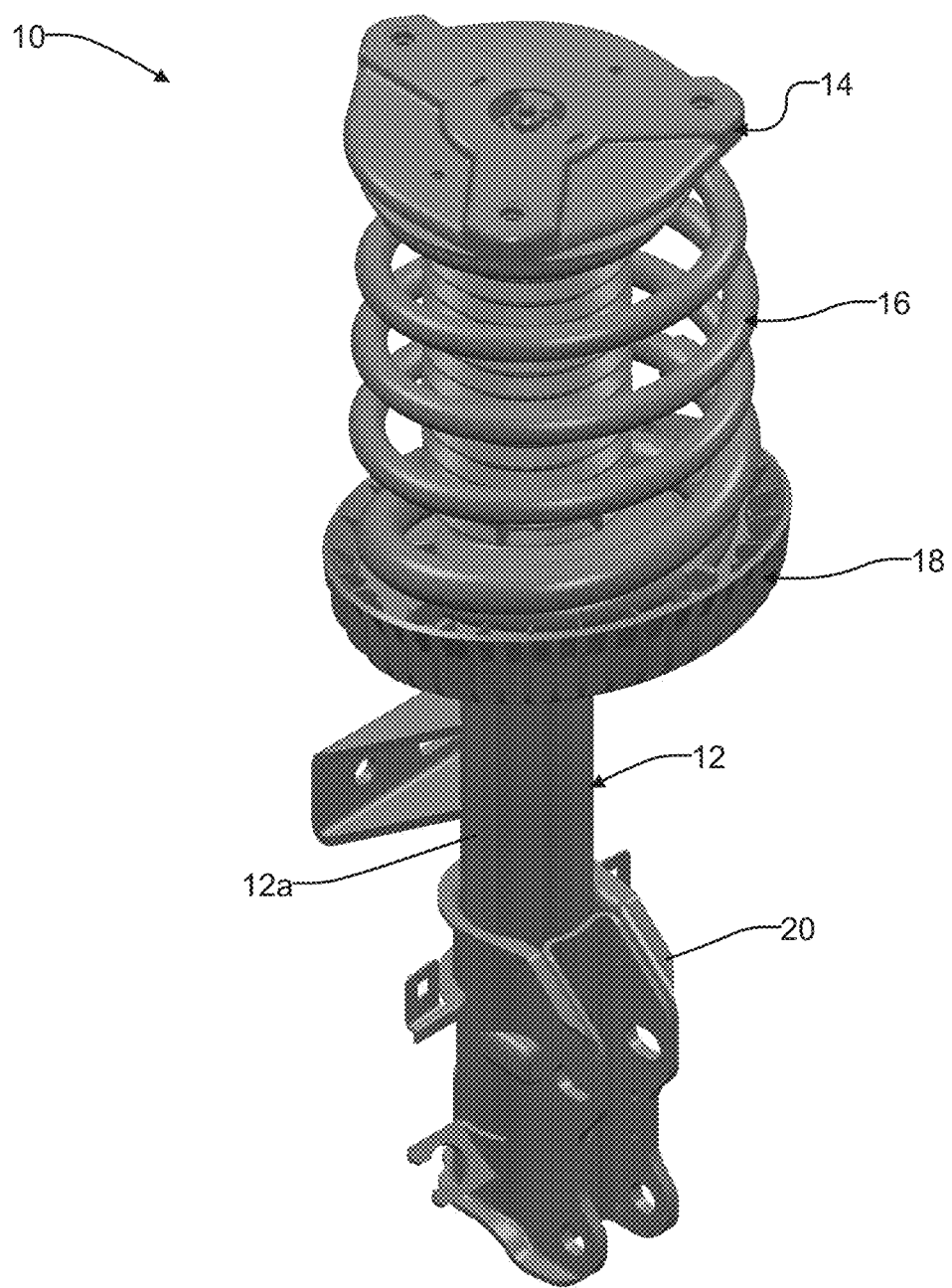
FIG. 1 is a perspective view of a strut-type damper in accordance with one embodiment of the present disclosure in which the damper incorporates a spring seat structure having a new catcher for controllably absorbing energy in the event of a fracture of a coil spring of the damper.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a strut-type damper 10 in accordance with one embodiment of the present disclosure. The damper 10 in this example includes a shock absorber 12 having a tubular body, an upper spring seat 14, a coil spring 16 and a lower spring seat 18. A mounting flange 20 enables the damper 10 to be secured at its lower end to a wheel component of a vehicle, typically a steering knuckle. A telescoping piston rod (not shown) of the shock absorber 12 is typically coupled to the vehicle's body. The lower spring seat 18 is fixedly secured the outer surface of the tubular shock absorber 12 housing 12a.

Figure 2:
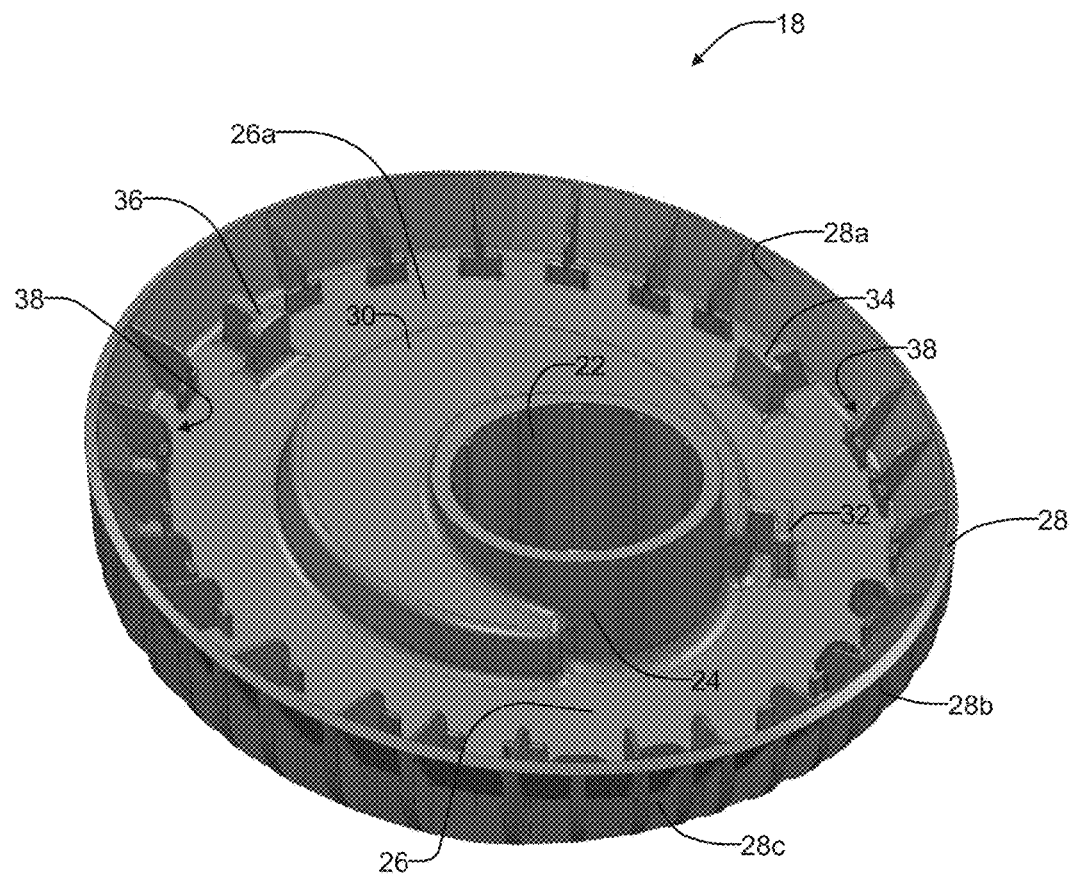
FIG. 2 is a perspective view of the lower spring seat of the damper of FIG. 1.

Referring to FIG. 2, the lower spring seat 18 can be seen in greater detail. The lower spring seat 18 includes an eccentrically located bore 22 which helps to define an inner annular flange 24. The inner annular flange 24 is dimensioned to receive the housing 12a of the shock absorber 12. The inner annular flange 24 extends upwardly from a base portion 26. A circumferential wall extends perpendicularly from the base portion 26 to form a catcher 28. A hub portion 30 also extends upwardly from the base portion 26 and helps to locate the lower end of the coil spring 16 on the lower spring seat 18. Coil locating ribs 32, 34 and 36 may also be formed to project upwardly from the base portion 26 to help locate the lower end of the coil spring 16 on the lower spring seat 18.

The lower spring seat 18 in this example may be formed from a non-metallic, lightweight material, for example a high strength plastic or a composite. A principal feature of the catcher 28 is the inclusion of a plurality of integrally formed, radially arranged impact absorbing structures 38. In this example the impact absorbing structures 38 take the form of T-shaped structures when viewed in plan (i.e., when looking straight down on an inside surface 26a of the base portion 26).

Figure 3:
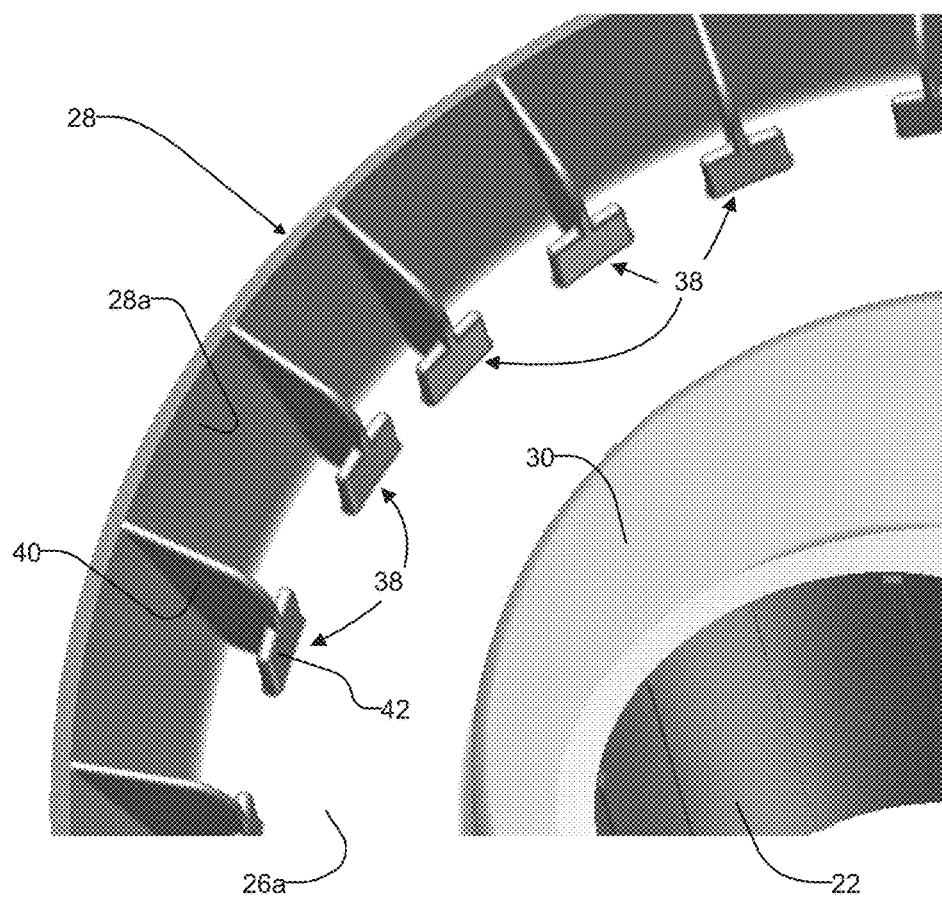
FIG. 3 is an enlarged view of a portion of the lower spring seat better showing the catcher and the impact absorbing structures.

With reference to FIG. 3, a plurality of the impact absorbing structures 38 can be seen in greater detail. Each impact absorbing structure 38 in this example has a radially arranged portion 40 (i.e., arranged generally radially relative to an axial center of the base portion 26) which forms a first crush rib 40 and a tangentially arranged portion which forms a second crush rib 42. Each first crush rib 40 is preferably integrally formed with its second crush rib 42.

Since the first crush ribs 40 project from both an inside surface wall portion 28a of the catcher 28, as well as an inner surface 26a of the base portion 26, they are directly exposed to the coil spring impact if the coil spring 16 fractures. The first crush ribs 40 thus form impact absorbing elements that are designed to deform (i.e., be partially or substantially crushed) to at least partially absorb and dissipate the energy from the fractured coil spring portion if the coil spring 16 fractures. The first crush ribs 40 in one example have a thickness of preferably about 1 mm-3 mm, although it will be appreciated that this dimension may vary depending on various factors, including, but not limited to, the dimensions of the coil spring 16 and/or the cross sectional thickness of its coils. The second crush ribs 42 are designed to collectively form a circumferential plane that further help to ensure that the first crush ribs 40 do not "fold" or collapse too easily toward the base portion 26 when impacted by the broken portion of the coil spring 16. In some instances it may occur that one or more of the second crush ribs 42 receive all or a majority of the impact force from a fractured coil spring. In summary then, both of the first and second crush ribs 40 and 42 cooperatively operate to absorb and dissipate the energy that is produced when the coil spring 16 fractures.

Figure 4:
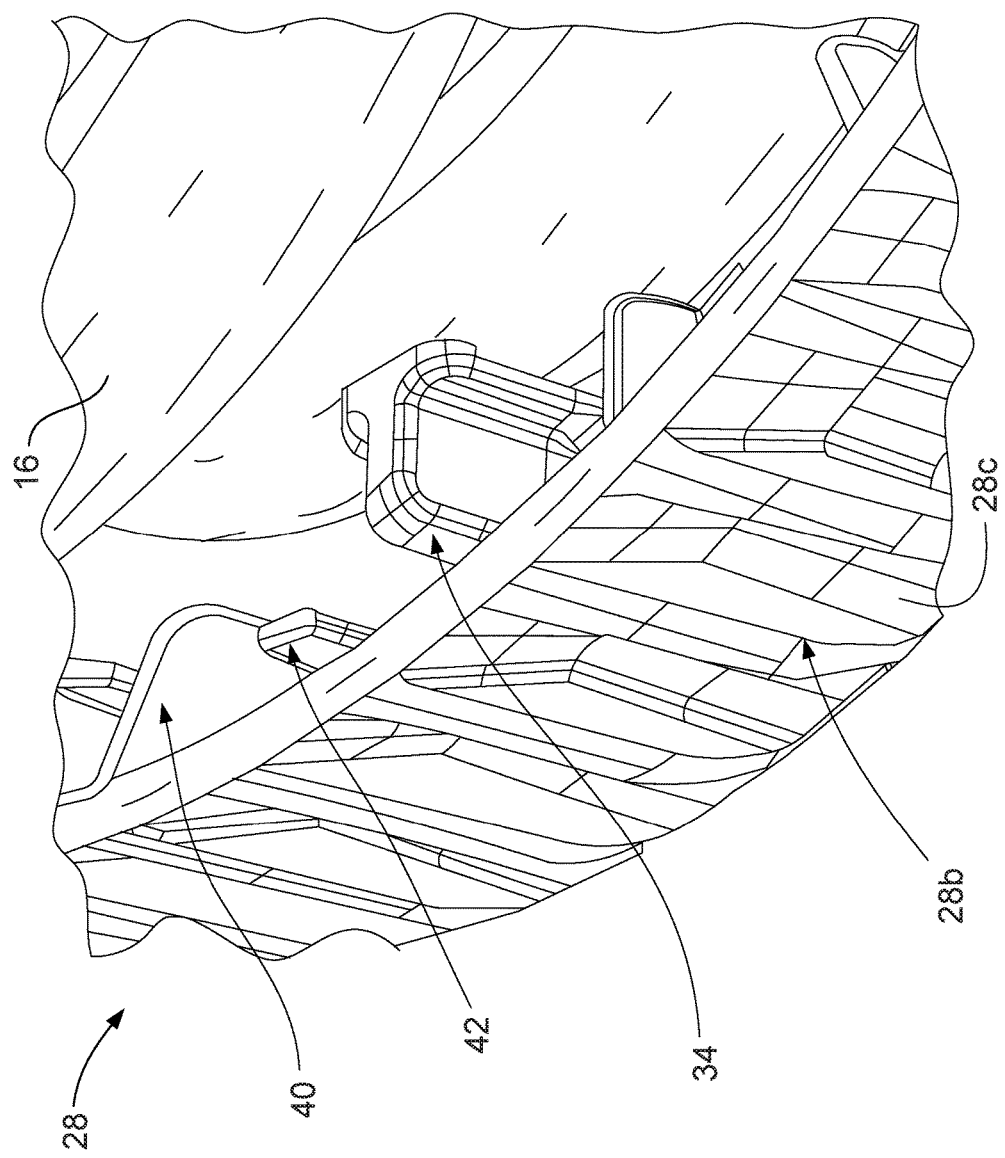
FIG. 4 is another enlarged view of a portion of the lower spring seat better illustrating a thickness of the strengthening ribs on an outer surface of the catcher relative to a thickness of each one of the crush ribs.

Referring briefly to FIG. 4, the catcher 28 in this embodiment also may have a plurality of circumferentially spaced apart reinforcement ribs 28b formed on an outer surface 28c thereof. In this embodiment the reinforcement ribs 28b provide further structural strength to the catcher 28 and the lower spring seat 18 in general. It will also be noted that the thickness of each reinforcement rib 28*b* is preferably at least slightly greater than the thickness of each crush rib 40. Furthermore, the thickness of each of the first and second crush ribs 40 and 42, respectively, is preferably thinner than the thickness of the catcher 28 in order to help ensure that the crush ribs 40 and 42 deform first and absorb the energy from a coil spring fracture event. The reinforcement ribs 28*b* help to ensure that the catcher 28 has sufficient strength to catch and restrain a broken section of the coil spring 16, without adding significant weight or bulk to the catcher.

Figure 5:
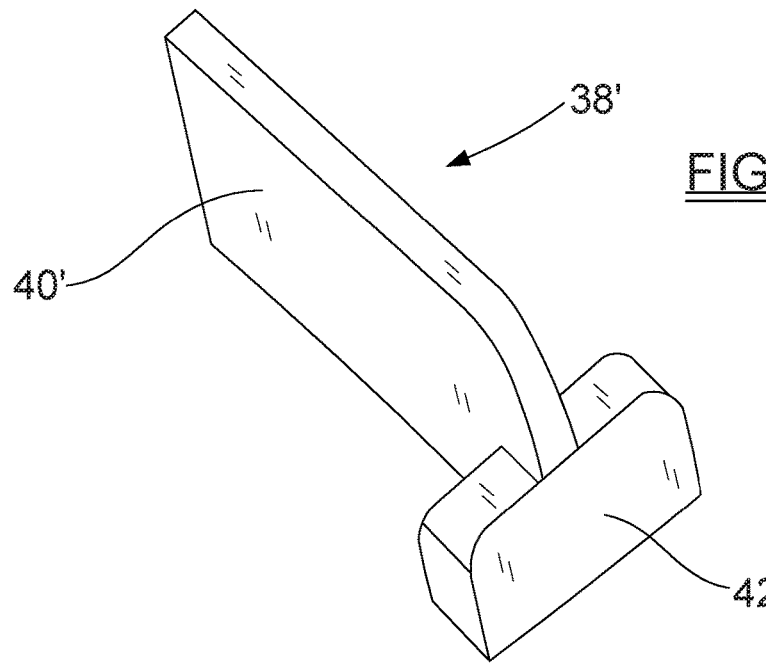
FIG. 5 is a perspective view of another embodiment of the impact absorbing structures in which a thickness of a second crush rib of the structure is greater than a thickness of a first crush rib of the structure.

Referring to FIG. 5, another embodiment of the impact absorbing structures 38' is shown. This embodiment is similar to the impact absorbing structures 38 as described above but incorporates a second crush rib 42' which is thicker than a first crush rib 40' of the structure. The increase in thickness of the second crush rib 42' over the first crush rib 40' may vary significantly, for example by 10%-100%, or possibly more Alternatively, the thickness of the first crush rib 40' may be selected to be greater than the thickness of the second crush rib 42'. The precise thickness of each of the crush ribs 40' and 42' may be selected to best meet the needs of a particular application. However, it is anticipated that in some applications it may be desirable to provide the second crush rib 42' with a slightly greater thickness than the first crush rib 40', as shown in FIG. 5. The increased thickness, in some instances, may help to provide a plane of increased area that further helps absorb and arrest movement of a broken portion of the coil spring 16 in the event the coil spring fractures.

Figure 6:
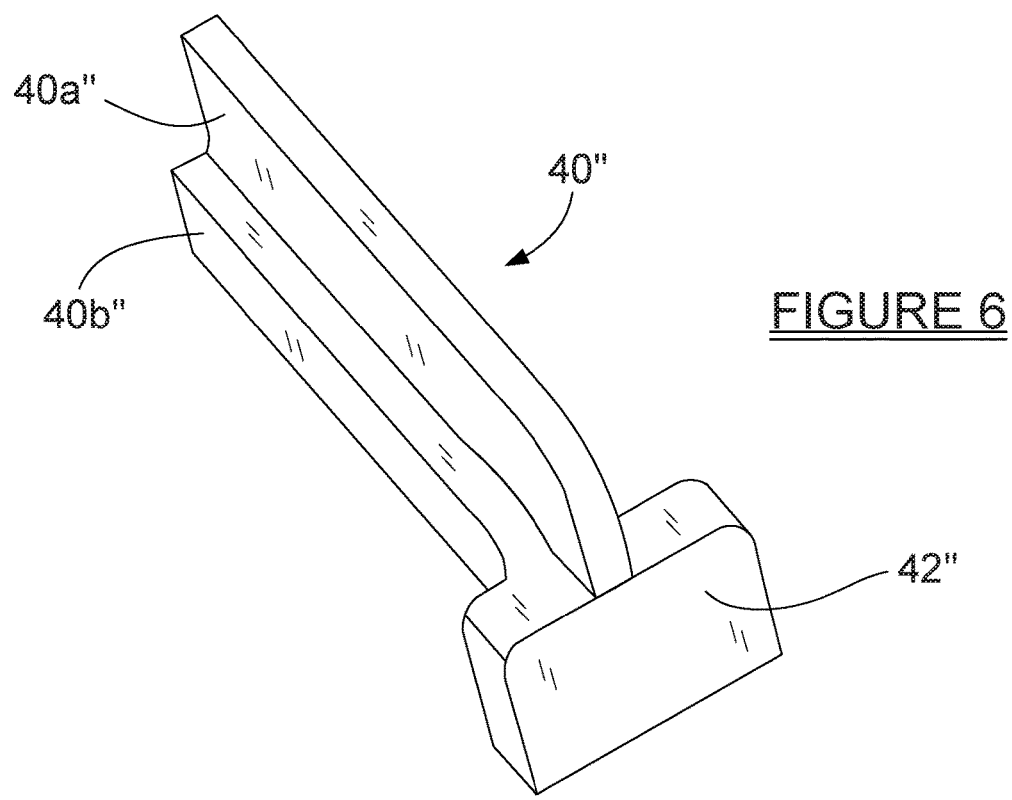
FIG. 6 is a perspective view of another embodiment of the impact absorbing structures in which the crush rib has an upper portion having a first thickness and a lower portion having a second thickness, with the second thickness being greater than the first thickness.
Figure 7:
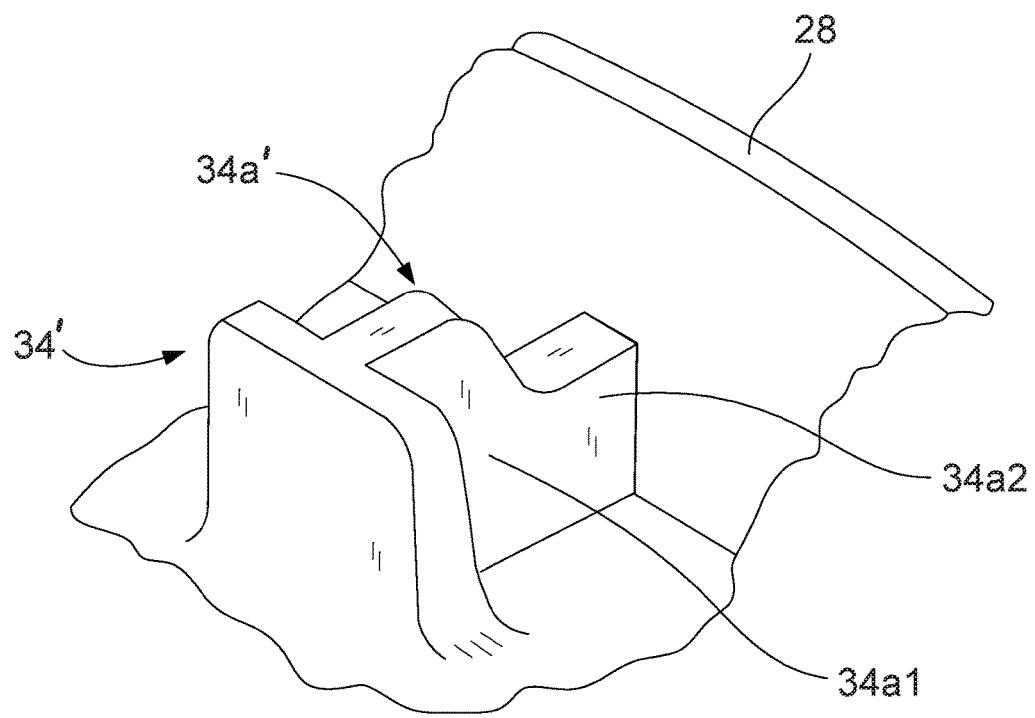
FIG. 7 is a perspective view of another embodiment of the coil locating ribs in which a portion of the coil locating rib extends into contact with the catcher, to thus further help to strengthen the catcher.

FIG. 6 shows another embodiment of the impact absorbing structures 38" in which the first crush rib 40" includes an upper section 40*a*" of one thickness, and a lower section 40*b*" having an increased thickness. A second crush rib 42" also has a thickness which is greater than the thickness of the upper section 40*a*" of the first crush rib 40", and in this example generally in accordance with the thickness of the lower section 40*b*". Accordingly, this embodiment even further expands the surface area plane that the second crush rib 42" forms to slow down, help absorb energy, and arrest movement of a broken portion of the coil spring 16.

Referring to 7, another embodiment 34' of the coil locating rib 34 shown. Coil locating rib 36 could likewise be constructed in an identical manner to coil locating rib 34'. Coil locating rib 34' has been modified to include a radial portion 34*a*' having a first portion 34*a*1 and a second portion 34*a*2. Second portion 34*a*2 extends out to the wall portion 28 of the lower spring seat 18. The second portion 34*a*2 thus further helps to reinforce the catcher 28.

Figure 8:
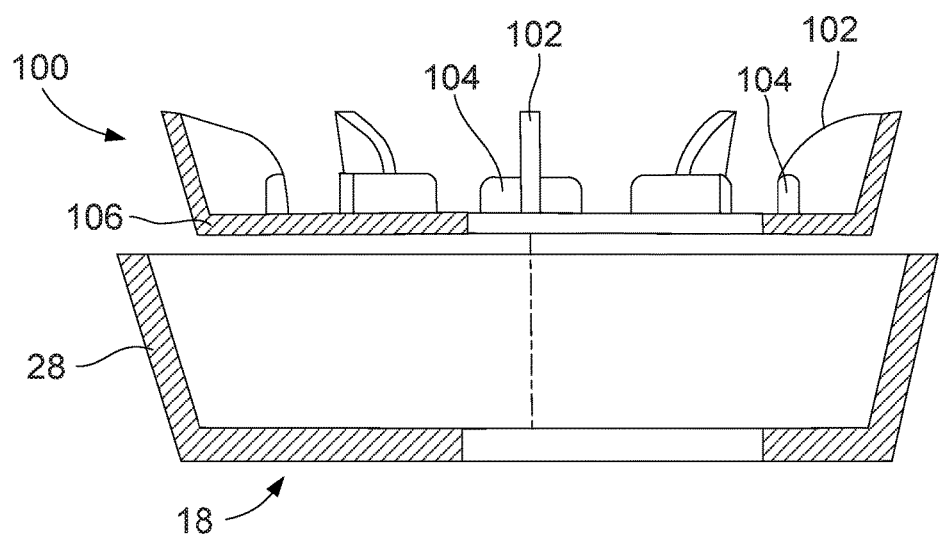
FIG. 8 is a side partial cross sectional view showing another embodiment of the present disclosure in which a plurality of impact absorbing structures formed by first and second crush ribs, are instead formed on an independent plate which fits on the base portion of the lower spring seat within the catcher.

Referring to FIG. 8, a plate 100 is shown in accordance with another embodiment of the present disclosure. The plate 100 is intended to be used with a modified version of the lower spring seat 18 which does not include the crush ribs 40 and 42. Instead, impact absorbing structures formed by first crush ribs 102 and second crush ribs 104 are formed on a floor portion 106 of the plate 100. The plate 100 is placed on the base portion 26 of the lower spring seat 18 before the spring 16 is assembled onto the lower spring seat 18. The inside surface wall portion 28*a* of the catcher 28 has a diameter that is just slightly greater than the outer diameter of the floor portion 106 of the plate 100 so that the plate fits securely within the inner diameter of the catcher 28. The first and second crush ribs 102 and 104 generally form an upwardly projecting, T-shaped, rib-like structure that may be integrally formed with the floor portion 106 of the plate 100. Optionally, the floor portion 106 of the plate 100 may include one or more cutouts to allow the coil locating structures 32-36 to project therethrough, or alternatively the coil locating structures 32-36 may be formed on the floor portion 106 of the plate 100. This configuration may also allow for slightly different material configurations to be used when manufacturing the lower spring seat 18 and the plate 100, since these two components are independent from one another in this embodiment.

It will be appreciated that the configuration and dimensions of the various embodiments of the impact absorbing structures 38 described herein may be varied considerably to tailor them to specific coil spring dimensions, spring rates, and other factors. The weight and/or type of vehicle that the strut-type damper 10 is being used with may also influence the number and precise configuration and/or placement of the impact absorbing structures 38.

The lower spring seat 18, and particularly the construction of the catcher 28, thus forms a means to significantly strengthen the catcher without significantly increasing its weight, dimensions or bulk, or cost of manufacture. Importantly, the catcher 28 of the present disclosure does not require any significant modifications to the construction of a coil spring or to any other portion of a strut-type damper. The entire lower spring seat 18, catcher 28 and impact absorbing structures 38, 38' or 38" may be integrally formed as a single component from high strength plastic, from a composite or any other suitably strong, lightweight material.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A strut-type damper comprising:
    a shock absorber having a housing with a telescoping piston rod projecting at least partially therefrom;
    a coil spring;
    an upper spring seat operably coupled to a distal end of the piston rod;
    a lower spring seat operatively coupled to the housing of the shock absorber, the upper and lower spring seats capturing the coil spring therebetween; and
    the lower spring seat including:
        a base portion having an opening for receiving the housing of the shock absorber and being fixedly securable to the housing;
        a generally circumferential wall portion extending from the base portion and forming a catcher for catching a broken portion of the coil spring in an event where the coil spring fractures; and
        an impact absorbing structure formed on the lower spring seat base portion, and configured to be crushed in the event of a fracture of the coil spring, wherein the impact absorbing structure comprises a plurality of spaced apart, impact absorbing structures extending from the base portion arranged and extending circumferentially around the catcher.

2. The strut-type damper of claim 1, wherein the impact absorbing structure comprises:
    a first crush rib arranged to project generally inwardly from an inside wall surface of the catcher towards an axial center of the lower spring seat, the first crush rib having a first height, the first crush rib being operative to be crushed by the broken portion of the coil spring when the coil spring fractures and to absorb energy from the broken portion of the coil spring; and a second crush rib projecting upwardly from the base portion, the second crush rib operating to be crushed by the broken portion of the coil spring and to further help absorb the energy from the broken portion of the coil spring.

3. The strut-type damper of claim 2, wherein the first crush rib is arranged to project radially inwardly generally toward the axial center of the lower spring seat.

4. The strut-type damper of claim 3, wherein the second crush rib is arranged tangentially relative to the axial center of the lower spring seat.

5. The strut-type damper of claim 2, wherein the second crush rib is formed to extend generally perpendicularly to the first crush rib.

6. The strut-type damper of claim 2, wherein the first crush rib and the second crush rib are integrally formed with the catcher and the base portion.

7. The strut-type damper of claim 2, wherein the lower spring seat, the first crush rib and the second crush rib are all integrally formed from plastic.

8. The strut-type damper of claim 2, wherein the second crush rib has a different thickness than the first crush rib.

9. The strut-type damper of claim 2, wherein the first crush rib has an upper portion having a first thickness and a lower portion having a second thickness, the second thickness being greater than the first thickness.

10. The strut-type damper of claim 1, wherein the lower spring seat further includes at least one coil locating rib formed on the base portion.

11. The strut-type damper of claim 10, wherein the coil locating rib includes a portion in contact with an inside surface of the catcher.

12. The strut-type damper of claim 1, wherein the impact absorbing structure comprises a plurality of impact absorbing structures that extend from the base to an inside wall portion of the catcher, wherein an edge of the impact absorbing structure is generally parallel to the base portion.

13. The strut-type damper of claim 1, wherein the impact absorbing structure comprises a plurality of impact absorbing structures that interconnect the base portion and the wall portion, the lower spring seat further comprising a plurality of additional support structures provided on an outside surface of the catcher.

14. The strut-type damper of claim 13, wherein each of the plurality of the impact absorbing structures interconnecting the base portion and the wall portion is aligned with each of the plurality of the additional support structures provided on the outside surface of the catcher.

15. A strut-type damper comprising:
a shock absorber having a housing with a telescoping piston rod projecting at least partially therefrom;
a coil spring;
an upper spring seat operably coupled to a distal end of the piston rod;
a lower spring seat operatively coupled to the housing of the shock absorber, the upper and lower spring seats capturing the coil spring therebetween; and
the lower spring seat including:
a base portion having an opening for receiving the housing of the shock absorber and being fixedly securable to the housing;
a generally circumferential wall portion extending from the base portion and integrally formed with the base portion, the generally circumferential wall portion forming a catcher for catching a broken portion of the coil spring in an event where the coil spring fractures; and
a plurality of circumferentially spaced apart, impact absorbing structures formed on the lower spring seat adjacent both of the catcher and the base portion, and extending from an inside wall portion of the catcher, wherein each impact absorbing structure circumferentially and radially extends relative to an axial center of the base portion; and
each said impact absorbing structure configured to be crushed in the event of a fracture of the coil spring and to absorb and dissipate energy from the broken portion of a fractured coil spring.

16. The strut-type damper of claim 15, wherein at least one of the impact absorbing structures comprises:
a first crush rib extending from an inside wall portion of the catcher and having a first height for absorbing and dissipating energy from the broken portion of the coil spring when the coil spring fractures; and
a second crush rib for further absorbing energy when the coil spring fractures.

17. The strut-type damper of claim 16, wherein the first crush rib extends radially inwardly toward the opening from the inside wall portion of the catcher.

18. The strut-type damper of claim 16, wherein the second crush rib extends generally tangentially relative to an axial center of the base portion.

19. The strut-type damper of claim 16, wherein the first crush rib and the second crush rib are integrally formed.

20. The strut-type damper of claim 15, wherein the lower spring seat and the impact absorbing structures comprise an integrally formed component.

21. The strut-type damper of claim 20, wherein the integrally formed component is formed from plastic.

22. A strut-type damper comprising:
a shock absorber having a housing with a telescoping piston rod projecting at least partially therefrom;
a coil spring;
an upper spring seat operably coupled to a distal end of the piston rod;
a lower spring seat operatively coupled to the housing of the shock absorber, the upper and lower spring seats capturing the coil spring therebetween; and
the lower spring seat including:
a base portion having an opening for receiving the housing of the shock absorber and being fixedly securable to the housing;
a generally circumferential wall portion extending from the base portion and integrally formed with the base portion, the generally circumferential wall portion forming a catcher for catching a broken portion of the coil spring in an event where the coil spring fractures; and
a plurality of impact absorbing structures formed on the lower spring seat adjacent both of the catcher and the base portion, and extending from an inside wall portion of the catcher;
each said impact absorbing structure configured to be crushed in the event of a fracture of the coil spring and to absorb and dissipate energy from the broken portion of a fractured coil spring, and each said impact absorbing structure including; and
a first crush rib extending from an inside wall portion of the catcher radially inwardly toward an axial center of the lower spring seat, for absorbing and dissipating energy from the broken portion of the coil spring when the coil spring fractures; and a second crush rib integrally formed with the first crush rib and arranged generally tangentially relative to the axial center of the lower spring seat; and wherein the lower spring seat and the impact absorbing structures are integrally formed as a single piece component, the second crush ribs being circumferentially spaced apart from one another.

23. A strut-type damper comprising:

a shock absorber having a housing with a telescoping piston rod projecting at least partially therefrom;

a coil spring;

an upper spring seat operably coupled to a distal end of the piston rod;

a lower spring seat operatively coupled to the housing of the shock absorber, the upper and lower spring seats capturing the coil spring therebetween; and the lower spring seat including:
a base portion having an opening for receiving the housing of the shock absorber and being fixedly securable to the housing;
a generally circumferential wall portion extending from the base portion and forming a catcher for catching a broken portion of the coil spring in an event where the coil spring fractures; and
an independent impact absorbing structure including:
a plate having a floor portion;
a plurality of rib structures projecting outwardly from the floor portion, the rib structures configured to deform and to absorb energy from the broken portion of the coil spring when the coil spring fractures; and
wherein the plate has a configuration enabling it to fit within the catcher and to rest on the base portion of the lower spring seat, and to receive an end portion of the coil spring thereon.

* * * * *